United States Patent [19]

Lecrone

[11] Patent Number: 4,606,452
[45] Date of Patent: Aug. 19, 1986

[54] CONVEYOR AND WORK STATION FOR TURNING BAKERY PRODUCTS

[76] Inventor: Dale S. Lecrone, 2410 W. Main St., Jackson, Mich. 49202

[21] Appl. No.: 694,670

[22] Filed: Jan. 24, 1985

[51] Int. Cl.⁴ .............................................. B65G 47/24
[52] U.S. Cl. .................................................... 198/411
[58] Field of Search ............... 198/411, 412, 414, 375, 198/377, 468.1, 740, 374

[56] References Cited

U.S. PATENT DOCUMENTS

| | | | |
|---|---|---|---|
| 2,135,773 | 11/1938 | Sheppard | 198/740 X |
| 3,189,158 | 6/1965 | Lucas | 198/412 X |
| 3,269,516 | 8/1966 | Lucas | 198/412 X |
| 3,295,660 | 1/1967 | Nelson | 198/414 |
| 3,805,943 | 4/1974 | Warren | 198/412 |
| 4,073,374 | 2/1978 | Hinchcliffe et al. | 198/468.1 X |
| 4,387,890 | 6/1983 | Lampe | 198/411 X |
| 4,545,476 | 10/1985 | Calvert | 198/411 X |

*Primary Examiner*—Joseph E. Valenza
*Assistant Examiner*—Michael Stone
*Attorney, Agent, or Firm*—C. Hercus Just

[57] ABSTRACT

A conveyor and work station operable to support and convey elongated bakery products such as hot dog rolls and rotate them from one position upon the conveyor to another position thereon to deliver them more suitably to be received in packages, the rotation being effected by a disc-like pad or plurality of similar pads which are supported for rectilinear movement and, when engaging the products, the pads move longitudinally in the same direction and speed as the conveyor and the rotation of the pads is 90° about the axis of the pads during such longitudinal movement relative to the conveyor.

6 Claims, 4 Drawing Figures

CONVEYOR AND WORK STATION FOR TURNING BAKERY PRODUCTS

BACKGROUND OF THE INVENTION

Modern baking operations constantly seek to automate the handling of baked products, including the packaging of same, such as by inserting them in bags or the like. This also is an object in handling hot dog rolls which are elongated and frequently are formed in separable clusters in which the rolls are connected in side-by-side relationship with the axes parallel. As presently deposited upon conventional conveyors, the axes of the rolls are parallel to the conveyor which determines the path of the rolls. However, certain popular types of automatic packaging or bagging units require that the axes of the rolls be transverse to the path of movement of the rolls as they are directed to the open mouth of a bag to receive the clusters. Automatic rotation of the rolls about a vertical axes of a cluster of them, or a group of separate rolls in close side-by-side relationship, from one position to a second position such as described above is a problem which is solved by the present invention while the rolls are being conveyed upon the conveyor.

The use of turning mechanisms relative to conveyors is old in various industrial applications. For example, the following patents show examples of the use of "star" wheels to turn objects on a conveyor:

U.S. Pat. No. 2,814,376—Hood, Nov. 26, 1957,
U.S. Pat. No. 3,540,568—Wellauer, Nov. 17, 1970.
Pallets are rotated relative to a conveyor in:
U.S. Pat. No. 2,317,675—DeBurgh, Apr. 27, 1943,
U.S. Pat. No. 2,525,132—Herts et al., Oct. 10, 1950.
Parts of layers of bricks are rotated on a conveyor in:
U.S. Pat. No. 3,939,993—Lingl, Jr., Feb. 24, 1976.
A conveyor having a rotating unit is shown in:
U.S. Pat. No. 4,171,041—Lowe, Oct. 16, 1979.
Drums on a conveyor are rotated to orient a filling bung hole relative to a filling spout in:
U.S. Pat. No. 3,993,199—Jorgensen et al., Nov. 23, 1976.
Rectilinear mechanisms for various purposes relative to conveyors are shown in:
U.S. Pat. No. 3,712,452—Takahashi, Jan. 23, 1973,
U.S. Pat. No. 4,173,107—Wilson, Nov. 6, 1979,
4,327,826—Wilson, May 4, 1982.

The present invention employs different concepts in conveyor mechanisms from those shown in the foregoing patents which are hereby made of record and copies filed herewith.

SUMMARY OF THE INVENTION

It is among the primary broad objects of the invention to provide a conveyor with a work station used in connection with elongated bakery products deposited upon the conveyor either in cluster form with the axes parallel to each other and also parallel to the path of movement by the conveyor, or single elongated objects in close side-by-side relationship with the axes parallel to the path of movement by the conveyor and, when the objects reach the work station, they automatically are engaged by mechanism to rotate the objects substantially 90° about a vertical axis and thereby dispose the objects with their axes transverse to the path of movement of the conveyor for discharge of the rotated objects into packages, such as bags having an open mouth positioned to receive the rotated objects automatically, after which the packaged or bagged objects may be sealed and otherwise handled as desired.

Another object of the invention is to provide a stationary frame which supports a conventional conveyor for baked products and the like to move the same along a given path and a secondary frame is mounted stationarily above the first stationary frame and contains mechanism in the nature of disc-like pads which are rotatable about axes perpendicular to the conveyor, the pads being of an area adequate to overlie at least the major portion of the area of a cluster of such baked product or group of separated elongated products in close side-by-side relationship and the mechanism also includes means to lower said pad or pads into engagement with the upper surfaces of the bakery products, move the pads in the same direction and at the same speed as the objects while engaging the same and also simultaneously rotating the pads and objects to an extent desired, such as, for example, 90°, and substantially at the completion of the rotation of the objects, the pads are elevated from engagement with the objects and are moved rearwardly to a starting position to engage the next batch of objects being advanced by the conveyor.

Depending upon the width of the conveyor, the secondary frame is adapted to support either a single pad or plural similar pads in side-by-side relationship and the limited rotation of the pad or pads is effected by means of a link connected at one end to a rim portion of each pad, the opposite end being connected to said stationary secondary frame, whereby as the axes of the pads are advanced in the same direction and at the same speed as the baked products on the conveyor, it will be seen that the movement of that rim portion of the pad which is connected to the link is retarded or prevented from longitudinal movement with respect to the conveyor and thereby effect the desired rotation of the pad about its axis and effect turning of the baked products as described above from one position in which they were deposited upon the conveyor, to a second position in which the axes thereof extend transversely across the conveyor for reception into packaging means such as bags or the like.

Still another object of the invention is to provide the rectilinear movement of the pad or pads in the form of a transverse member which extends above and across the conveyor and is provided with upright side members at opposite ends which are connected to vertically spaced support and drive means connected to the side members at vertically spaced locations, the drive means comprising endless flexible members extending around similar rotatable members longitudinally spaced on elongated horizontal parallel members fixed to opposite sides of said secondary frame, and power means are connected to at least one of said rotating members and due to the endless flexible members extending around said rotatable members, all of the rotatable members will simultaneously be driven with the upper and lower spans thereof moving longitudinally in the same directions respectively forwardly and rearwardly relative to the conveyor and parallel thereto.

Details of the foregoing objects and of the invention are set forth hereinafter, and the same are illustrated in the accompanying drawings comprising a part thereof.

DETAILED DESCRIPTION OF THE PREFERRED EMBODIMENTS OF THE INVENTION

Referring to the various figures, it is to be understood that the present invention is adapted to be mounted upon an elongated stationary frame 10 and suitably supported, upon legs or otherwise, not shown, in accordance with conventional structure. Slidably movable along the stationary frame 10 is an endless flexible conveyor 12 which also is shown fragmentarily or in section in the various figures for purposes of supporting elongated bakery products 14 which are specifically illustrated as clusters of hot dog rolls. Although these are shown in cluster form in FIGS. 1, 3 and 4, it is to be understood that they could be separate but closely aligned in side-by-side relationship.

Figure 1:
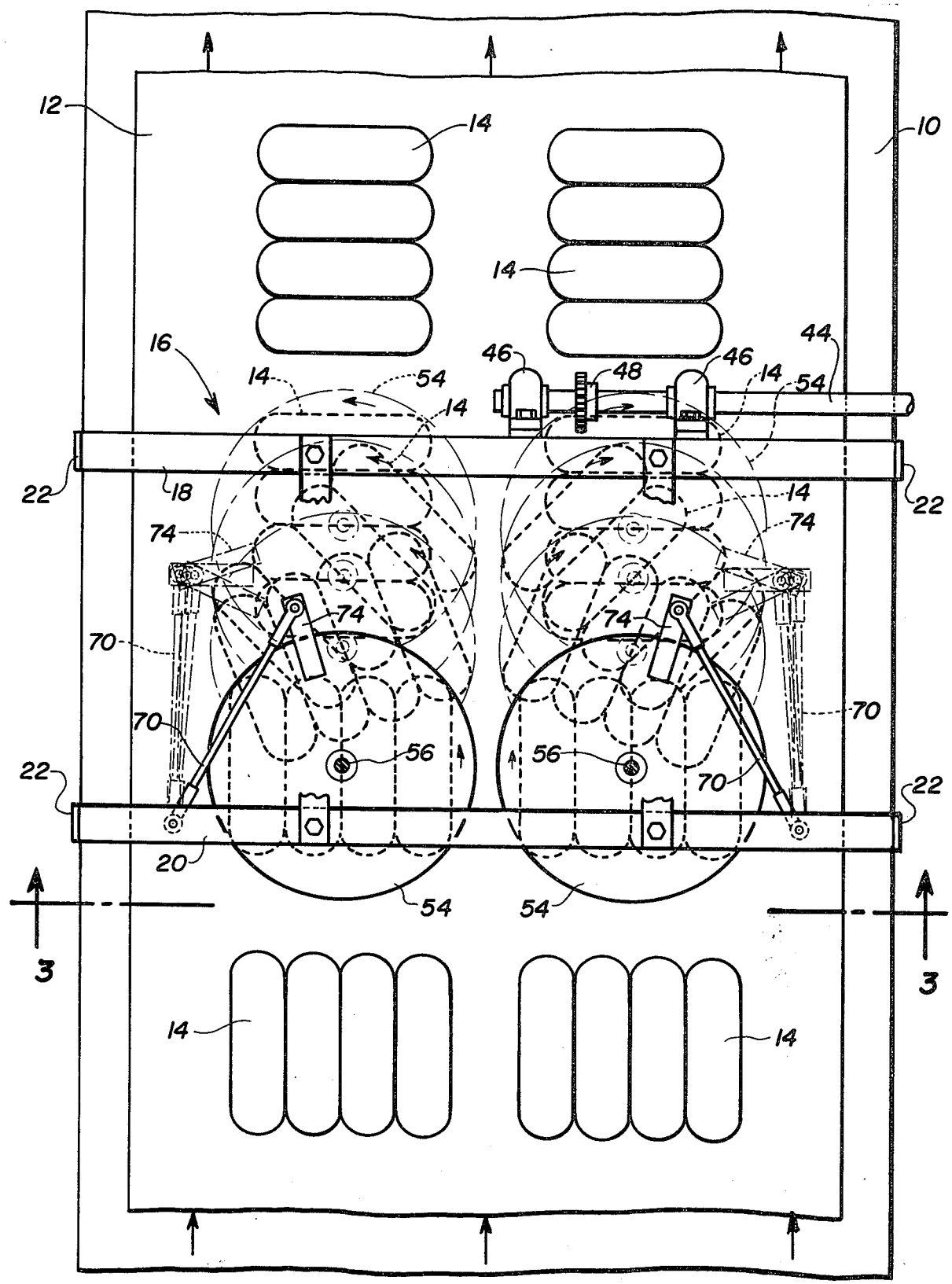
FIG. 1 is a plan view of a fragmentary portion of an elongated conveyor and illustrates a secondary frame mounted upon a fragmentarily illustrated portion of an elongated stationary frame which supports the conveyor, the secondary frame including roll turning mechanism comprising the principal portion of the present invention.

In the type of roll baking mechanism extensively used at present, clusters of the products 14 are discharged from the bake oven onto the conveyor 12 which is moving in the direction of the arrows shown in FIG. 1, the axes of the products being parallel to the path of movement of the conveyor. However, one type of packaging equipment commonly in use at present in bakeries for purposes of enclosing baked products is arranged to receive the products 14 but the axes thereof extending transversely to the path of movement of the conveyor 12, such as illustrated in the upper portion of FIG. 1. Therefore, the primary object of the present invention is to provide mechanism to automatically rotate either groups of separated elongated products or clusters thereof from the position thereof shown in the lower portion of FIG. 1, to the transverse position shown in the upper portion of FIG. 1 in order to have the same readily received within bags, for example, which are supported in packaging machinery, not shown, with the open ends thereof directed toward the oncoming product to receive them, followed by closing of the packages or otherwise.

Intermediately of the ends of the stationary frame 10 and conveyor 12 shown fragmentarily in FIG. 1 is a work station 16 which comprises a secondary frame in the form of longitudinally and vertically spaced pairs of transverse frame members 18 and 20 which are affixed to vertical supports 22 that are connected at the lower ends thereof to the opposite sides of stationary frame 10. The secondary frame also includes vertically spaced pairs of longitudinally extending elongated plates 24 which are best shown in FIGS. 2 and 4 for supporting longitudinally spaced pairs of bearings 26 which respectively rotatably receive end portions of transversely extending and vertically spaced pairs of parallel shafts 28 and 30.

Opposite ends of the shafts 28 and 30 have sprocket gears 32 and 34 respectively fixed thereto and pairs of endless sprocket chains 36 and 38 respectively extend around the sprocket gears 32 and 34. It is desired to use flexible connecting means between the pairs of shafts 28 and 30 to insure simultaneous accurate rotation thereof during operation and the use of sprocket gears and corresponding chain is one form of insuring this, as illustrated. If desired, however, timing belts or some similar mechanism may be substituted for the sprocket gears and chain as long as same assure uniform rotation of the shafts 28 and 30 for reasons explained below.

Figure 2:
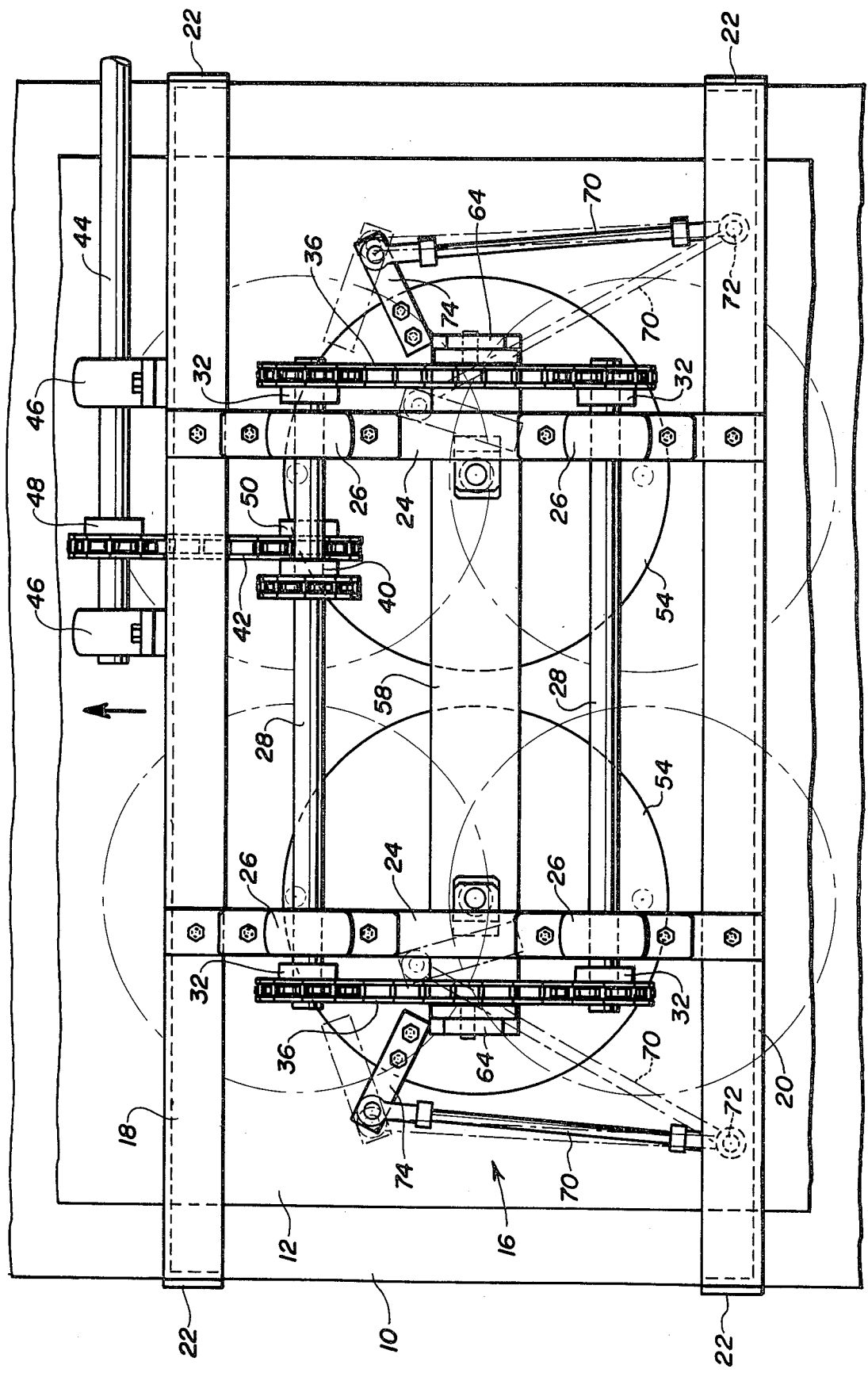
FIG. 2 illustrates on a larger scale than in FIG. 1 a plan view of the roll turning mechanism shown in FIG. 1, the stationary frame and conveyor also being shown fragmentarily as in FIG. 1.
Figure 3:
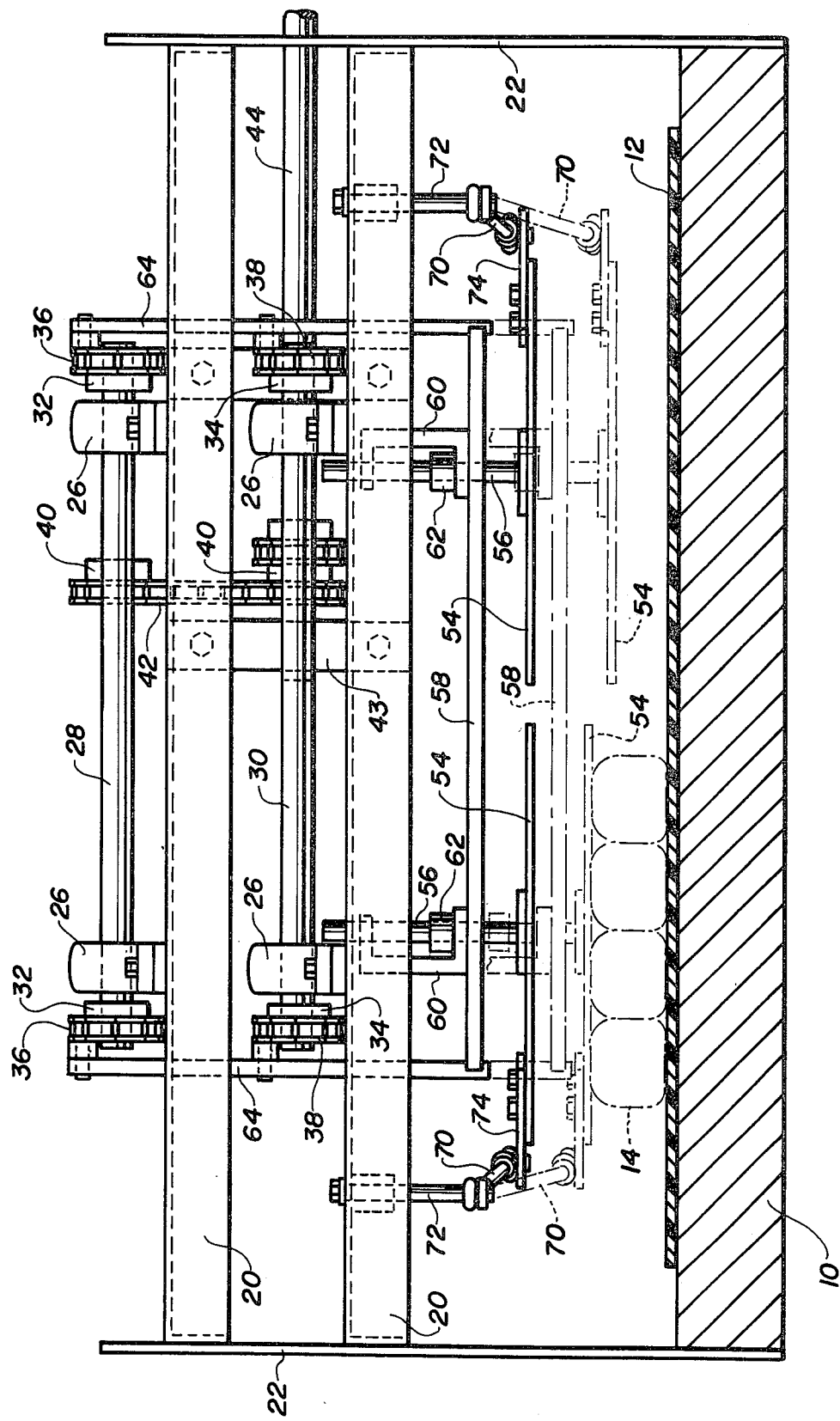
FIG. 3 is a transverse vertical section taken on the line 3—3 of FIG. 1 and illustrating in full lines one position of the roll turning mechanism and, in phantom, showing the turning mechanism in engagement with the tops of rolls.
Figure 4:
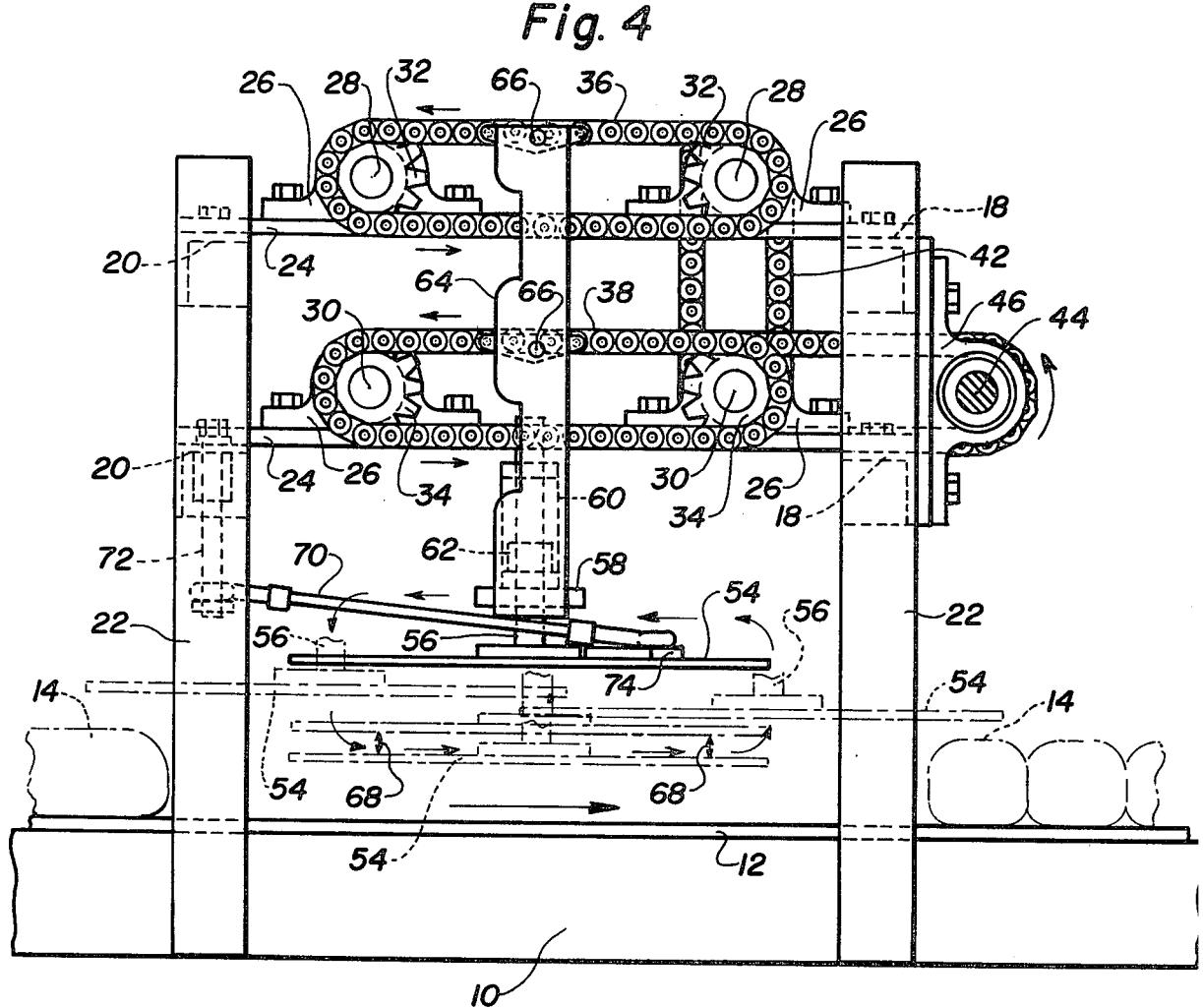
FIG. 4 is a fragmentary side elevation of the roll turning mechanism shown in the preceding figures and in which the roll turning mechanism is shown both in full lines and phantom respectively in FIG. 3 and, by means of arrows, illustrating the rectilinear movement of the roll turning mechanism.

It also is desired that the upper and lower pairs of sprocket chains 36 and 38 move accurately and simultaneously with respect to each other and to assure this, intermediately of the ends of the shafts 28 and 30 additional sprocket gears 40, see FIGS. 2 and 3, are fixed respectively to the shafts 28 and 30 and an endless flexible sprocket chain 42 extends therearound as best shown in FIGS. 3 and 4. To stabilize the secondary frame members 20, for example, an additional vertical strut 43 extends therebetween as shown in FIG. 3.

For purposes of driving the shafts 28 and 30, a drive shaft 44 is included in the work station and is supported by bearings 46 attached to one of the secondary frame members 18, for example. The outer end of the shaft is fixed to a suitable source of power, not shown, such as an electric motor, speed and control mechanism, not shown, said shaft otherwise being supported by a pair of bearings 46 shown in FIGS. 2 and 4. A drive sprocket 48 is fixed to drive shaft 44 between the bearings 46 and a companion driven sprocket 50 is fixed to the right-hand shaft 30 shown in FIG. 4, sprockets 48 and 50 being interconnected by an endless sprocket chain 52 which extends therearound. As stated hereinabove, if desired to substitute a different type of positive drive mechanism between drive shaft 44 and the pairs of horizontal shafts 28 and 30 is desired, such as timing belts and corresponding pulleys, same is understood to be within the purview of the present invention.

The work station 16 and all and all the mechanism therein described above is provided for purposes of supporting preferably disc-like pads 54 which are the means of the present invention for engaging the elongated baked products 14, such as clusters or groups thereof, said pads being positively rotated a predetermined extent, such as 90° for example, in order to rotate the products 14 from the position shown in the lower part of FIG. 1, which is that in which they are received upon the conveyor 10, to the second position thereof shown in the upper part of FIG. 1, in which the axes of the elongated products extend transversely to the path of movement of the conveyor 12. The pads preferably have a lower surface affording at least limited friction and, in the preferred embodiment of the invention, the conveyor 12 preferably has an upper surface of only limited friction, whereby rotation of the products 14 may readily be accomplished by rotation of the pads 54. The pads are supported by being affixed to the lower ends of vertical shafts 56 which extend through suitable openings in a transverse member or bar 58 which also support brackets 60 which are provided with upper and lower bearings through which the shafts 56 extend. Collars 62 fixed to the shaft suitably regulate the vertical position of the pads 54 with respect to the transverse member 58 which supports them.

The transverse member 58 is affixed at its outer ends to upright side members 64 which are best shown in side elevation in FIG. 4 and the upper portions thereof are provided with pins 66 or other suitable means by which the side members 64, transverse member 58, and the disc-like pads 54 are supported by corresponding spans of the endless sprocket chains 36 and 38. For example, in FIG. 4, it will be seen that the pins 66 connect the side members 64 respectively to the upper spans of the chains 36 and 38. Due to the accurate connection of the chains 36 and 38 with respect to the sprocket gears that support them, it will be seen that as the chains are driven, for example, in one direction as shown by the arrows adjacent the upper span in FIG. 4, the vertically disposed side members 64 will constantly be vertical and perpendicular to the conveyor 12 as the same are moved forwardly according to the upper arrows and rearwardly according to the lower arrows adjacen the lower spands of the chains 36 and 38. At the opposite ends of the path of movement of said chains, the side members 64 will either be lowered or raised simultaneously, while vertical, and thus carry the pads 54 horizontally in a forward or rearward direction as well as lowering or raising direction, such movement comprising a rectilinear pattern as shown by the directional arrows illustrated in FIG. 4.

It is to be understood that the forward movement of the pads 54 is at the same speed as the conveyor 12 and correspondingly of the baked products 14. Also, at the end of the forward movement, the pads 54 are elevated and then are moved rearwardly while elevated, until at the end of that excursion they are lowered for engagement with the products 14 in order to rotate the same while being moved forwardly by the conveyor 12, the rotating means being described hereinbelow.

For purposes of facilitating the rotation of the products 14 upon the conveyor 12, the material from which the conveyor if formed preferably is of a plastic nature which affords minimum friction and the pad 54 preferably has a lower surface offering adequate friction, such as by being of the order of a thin frictional belt material. Also, the pad per se is relatively lightweight and formed from suitable aluminum, plastic or other similar lightweight material. In addition, a limited amount of floating action of the pad 54 is permitted, the extent of the floating being indicated by the relatively short vertical double-headed arrow 68 shown in the central lower portion of FIG. 4. Downward limit of such movement is controlled by the collars 62 which engage the lower bearing of the brackets 60 as shown best in FIG. 3. Accordingly, the weight of the pad 54 is such that it will not crush the baked products 14 but nevertheless will permit satisfactory frictional engagement of the pad with the upper surfaces of the products 14 and thereby achieve the desired rotation described above with respect to the axes of the elongated products 14 and shown in said positions respectively in the lower and upper portions of FIG. 1.

Limited rotation or turning of the pads 54 about the axes of shafts 56 is accomplished by relatively simple but highly effective means in the form of links 70, there being one provided for each of the pads 54 as best shown in FIG. 1. One end of each link is secured pivotally to a stationary part of the mechanism such as the lower end portion of a vertically depending pin 72, see FIG. 4, which is affixed at its upper end to secondary frame member 20, for example. The opposite end of each link is secured to a portion of the rim of each of the pads 54 and, in the preferred construction as best shown in FIG. 1, each pad has a short finger 74 affixed thereto and projecting radially therefrom for connection of the outer end thereof to said other ends of the links 70.

As explained above, the pads 54 are moved in a forward direction, as carried by transverse member 58, at the same speed and parallel to the conveyor 12. The lengths of the links 70 and the fingers 74 have been calculated with respect to the diameter of the pads 54 so that as the pads 54 are moved forward from the full line position shown in FIG. 1, for example, to the uppermost phantom position shown in said figure, the pads will have been rotated through 90° of movement about the axis of the shafts 56 thereof and thus achieve the desired degree of rotation of the products 14 upon the conveyor 12 from that shown in the lower portion of FIG. 1 to that shown in the upper portion thereof, wherein the axis of the products extend transversely with respect to the path of movement on the conveyor 12. In the latter position, they are arranged for reception in packaging bags or the like in accordance with the objective of the invention.

In the excursion of the transverse member 58 and the pads 54 carried thereby, as soon as the maximum rotation of the pads 54 has occurred as shown in the uppermost phantom position indicated in FIG. 1, the rectilinear path illustrated by the small arrows in FIG. 4 is such that the pads 54 will be elevated and thus not impede the forward or delivery movement of the products 14 to advance to the packaging equipment. The speed of the conveyor and the placement of the products 14 thereon has been employed in the computation of the length of the excursion in the rectilinear path of the pads 54, whereby the pads descend into engagement with the oncoming products 14, rotate them during the forward excursion of the pads and member 58, as well as the elevation of the pads 54 from the baked products at the end of the rotation thereof as aforesaid.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A conveyor and work station system operable to rotate elongated baked products from one position on the conveyor to a second position thereon in which they are adapted for current types of packaging, said system comprising in combination, a stationary frame, a conveyor movable longitudinally therealong, means to deposit said elongated products upon said conveyor with the axes extending in said one direction thereon, a work station comprising at least one pad supported for rotation about an axis perpendicular to said conveyor, means mounted above said conveyor on said frame and operable to engage said pad sequentially with said products and move said pad at the same speed and direction as said conveyor while said pad is rotated positively about an axis perpendicular to said conveyor and thereby rotate said products to said second position upon said conveyor, means operable sequentially to effect disengagement of said pad from said products substantially at the completion of turning said products as aforesaid, and means to rotate said pad positively while the axis thereof moves at the speed of the conveyor, said rotating means comprising means extending between and respectively connected to a part of said pad and a fixed location upon said stationary frame and operable to retard the movement of said part of said pad and effect rotation thereof and baked products engaged thereby while the axis of said pad moves at the speed and in the same direction of said conveyor.

2. The system according to claim 1 in which said means to retard movement of said part of said pad comprises a link connected at one end to said pad adjacent the rim thereof and the opposite end being connected to said fixed location on said stationary frame.

3. The system according to claim 2 in which said means operable to engage said pad with said products comprises mechanism operable to effect movement of said pad through a rectilinear path, said pad comprising a disc-like member, and said pad being rotated a predetermined amount upon its axis by means of said link connected at one end to the rim of said pad and the other end being interconnected to a fixed location on said stationary frame, whereby during movement of the axis of said pad at the same speed and direction of said conveyor the portion of the rim of the pad to which the link is connected is retarded to effect rotation of said pad about the axis thereof sufficiently to rotate said product from said one position to said second position, as aforesaid.

4. The system according to claim 3 further including a secondary frame fixed to said stationary frame and extending upward from and across the same, vertically spaced pairs of endless flexible members supported on rotatable means spaced longitudinally at opposite sides of said secondary frame, a transverse member extending between opposite edges of said conveyor above the same and upstanding side members fixed to opposite ends of said transverse member, means connecting said side members to said endless flexible members at vertically spaced locations on said side members, means to drive said rotatable means simultaneously at the same speed and direction and thereby effect rectilinear movement of said transverse member, and said pad being rotatably supported by said transverse member intermediately of the ends thereof to rotate said pad and product while being advanced with said conveyor.

5. The system according to claim 4 in which a pair of pads are supported respectively upon axes transversely spaced upon said transverse member, said pads being disc-like and frictionally engageable with the top surfaces of elongated bakery products to rotate them upon said conveyor whether said products are in single or cluster form, and said system further including means to rotate said disc-like pads respectively in opposite directions equal amounts and comprising one link for each pad, said links respectively being connected to rim portions of said pads respectively adjacent opposite sides of said secondary frame and the opposite ends of said links being connected to stationary locations on opposite sides of said secondary frame, whereby when said transverse member and the pads supported thereon are moved simultaneously at the same direction and speed as said conveyor while the pads are engaging said products, said pads will be rotated while being advanced longitudinally and thereby rotate the products respectively engaged by said pads.

6. The system according to claim 1 in which the bakery products are clusters of elongated hot dog rolls of limited number in each cluster and the same are deposited initially on the conveyor with the axes of the rolls parallel to said conveyor, said pad being disc-like and of an area adequate to extend across at least the major area of said cluster, and the system further including means to rotate said disc and cluster substantially 90° while in engagement during movement upon and with said conveyor and at the same speed before said disc is elevated from engagement with said cluster, whereby said cluster when rotated to said second position is disposed with the axes of the rolls extending transversely to the conveyor and thereby in position to be received as desired into a package for the same.

* * * * *